United States Patent [19]

Pouchain et al.

[11] Patent Number: 4,479,503
[45] Date of Patent: Oct. 30, 1984

[54] RESTORATION OF STONE OBJECTS

[76] Inventors: Maurizio Pouchain, Via Casal del Marmo, 660, 00166 Roma; Ludovico Medolago Albani, Via Sabrata, 22, 00198 Roma, both of Italy

[21] Appl. No.: 514,896

[22] Filed: Jul. 18, 1983

[30] Foreign Application Priority Data

Jun. 1, 1983 [IT] Italy ................................ 48405 A/83

[51] Int. Cl.³ ............................................... B08B 7/04
[52] U.S. Cl. ............................................ 134/2; 134/13; 134/30; 134/42
[58] Field of Search ........................ 134/2, 13, 30, 42

[56] References Cited

U.S. PATENT DOCUMENTS 3,511,707  5/1970  Flamme ............................. 134/2 X
3,529,999  9/1970  Boeniger .............................. 134/2
4,076,868  2/1978  Roth et al. ......................... 134/2 X

FOREIGN PATENT DOCUMENTS 2815236  10/1979  Fed. Rep. of Germany ........ 134/30

Primary Examiner—Marc L. Caroff
Attorney, Agent, or Firm—Beveridge, DeGrandi & Kline

[57] ABSTRACT

The restoration of monuments and other objects made of stone is described. The process is carried out by immersing the stone object in deionized water in order to dissolve the calcium sulfate contamination present on the deteriorated stone which is caused by the pollutants present in air, then circulating the water containing the dissolved calcium sulfate through an ion exchange resin which can selectively trap the sulfate and release calcium hydroxide into the solution, followed by exposure to carbon dioxide under controlled conditions in order to thereby reprecipitate the calcium ions on the stone object as the carbonate in the calcite crystalline form.

4 Claims, 1 Drawing Figure

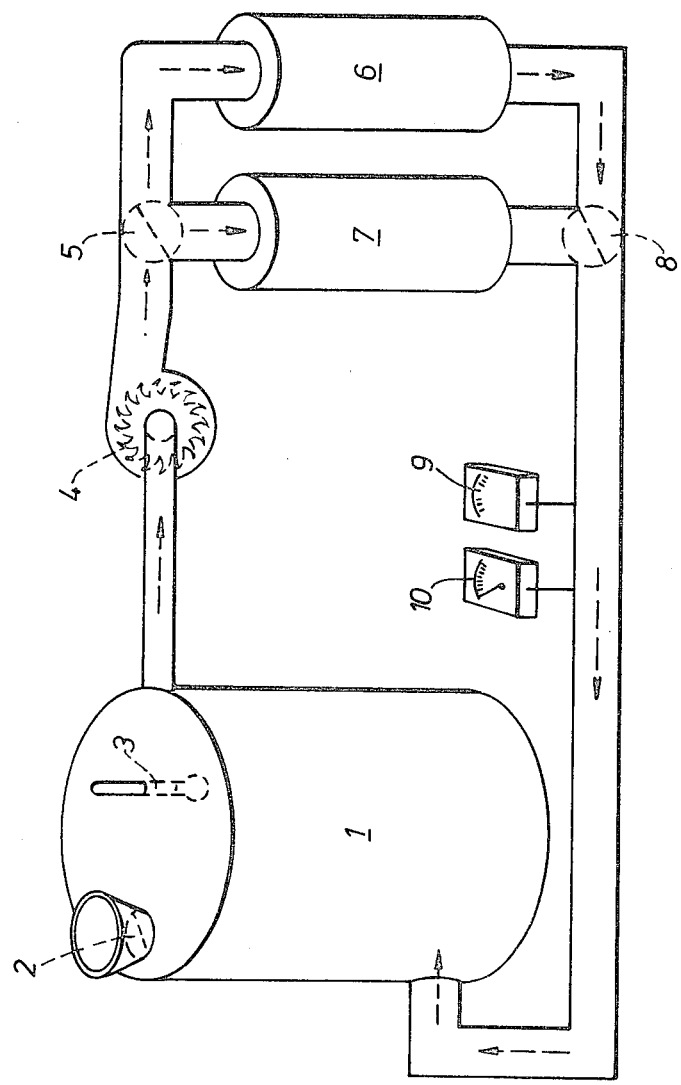

RESTORATION OF STONE OBJECTS

The invention concerns a procedure for restoring stone monuments by means of reconstituting the calcium carbonate, transformed by the atmospheric pollutants.

It is known that almost all ancient objects show clear signs of degradation arising from physical, biological and chemical causes.

Urban monuments suffer greatly from the action of sulfur bacteria which release sulfate ion $SO_4$ starting from the sulfur dioxide in polluted atmosphere due to burning of fossil fuels (coal and its derivatives).

However, the chemical causes are undoubtedly the most important and above all the most difficult to handle. These are closely related to the characteristics of the material used, and interact to enhance their damage with the physical and biological causes.

The most commonly used stone building materials are marble, limestone and sandstone. All three of these materials include calcite among their components, which is correctly held to be mainly responsable for their vulnerability.

From a chemical point of view, calcite is calcium carbonate $CaCO_3$, which is present in various crystalline forms in marble, where it is the major component. Limestone also contains a high percentage, although in less pure form, at times of biological origin, mixed with traces of iron and other metal salts, as in marls, etc.

Finally, it is also present in sandstone, where it is the substance which cements the quartz crystals to the other silicates.

Under neutral or alkaline conditions, calcium carbonate $CaCO_3$ is insoluble in water, but if the pH of the solution drops into acidity, the situation is created in which the compound undergoes chemical reactions which make it soluble.

The aqueous solutions of the dioxides of carbon, nitrogen and sulfur are among the most important of these solutions, and said dioxides are present in high concentrations in urban atmospheres.

Although the mechanisms of nitrogen dioxide attack is poorly understood, those of the carbon and sulfur oxides are known perfectly.

Carbon dioxide $CO_2$ is the principal product of the combustion of organic compounds, together with small quantities of carbon monoxide $CO$ which is rapidly corverted to $CO_2$. This carbon dioxide is present in the gas state in ever increasing amounts in the atmosphere, and is extremely soluble in water, forming carbonic acid.

This solution effects calcium carbonate by transforming it into the highly soluble carbonic acid bicarbonate according to the following reaction:

$$CaCO_3 + H_2O + CO_2 \rightleftharpoons Ca(HCO_3)_2$$
$$\text{insoluble} \qquad\qquad\qquad \text{soluble}$$

An analogous process occurs for sulfur oxide derivatives. In fact, in aqueous solution $SO_3$ forms sulfuric acid $H_2SO_4$, which reacts with calcium carbonate to form soluble calcium sulfate hydrate, commonly known as chalk.

These transformations profoundly affect the appearance and consistency of the stone, for thicknesses of various millimeters and even centimeters. Not only surface alterations are involved, but also deep ones which begin an unstoppable process.

The pounding of the surfaces exposes the stone ever more deeply to new attack by these corrosive solutions.

The aim of this invention is to realize a procedure to retransform the calcium sulfate hydrate in the surface and in depth alterations of stone, marble, etc. monuments, back into calcium carbonate, restoring the original structures.

This aim is achieved with a procedure for treating the stone elements which selectively eliminates the $SO_4^{--}$ ion and replaces it with the $CO_3^{--}$ ion, in place.

According to the invention, the object is immersed in deionized water so as the exploit the solubility property of the calcium sulfate, then realizing a forced circulation through ion exchange resins which can selectively retain the sulfate while leaving the calcium hydroxide in solution, according to the following reaction:

$$CaSO_4 \rightleftharpoons Ca^{++} + SO_4^{--} \rightarrow \text{anion exchange resin} \rightarrow Ca^{++} + 2OH^{--}.$$

The advantage of this method lies in the fact that it only removes the sulfate ion while releasing calcium ion to the original stone. Then in a second phase the object is exposed to the action of carbon dioxide under controlled conditions, in order to reprecipitate the calcium ion as the carbonate.

The difficulties lie above all in controlling the conditions for reforming the carbonate so that it precipitates in the calcite cuptalline form rather than argonite.

The thermodynamic equilibrium is in favor of calcite, but many factors may shift it to favor argonite: such as temperature, the presence of other cations, etc.

A preferred variant of the procedure may be obtained using the system schematized in the attached drawing.

The scheme shows in detail the treatment tank 1, in which the stone materials to be treated may be immersed or which may be placed around objects of larger size, which is filled through opening 2 with carbon dioxide free water, and whose temperature is controlled with thermometer 3, the liquid is then circulated by means of pump 4 through the shunts 5-8 in the anion exchange resins 6, and in column 7 with $Ca(OH)_2$, to return to the vat 1, according to the arrows, while the pH is measured in device 9 and the conductivity in conductometer 10.

The scheme for treating the stone materials may be described as follows:

characterization of the objects stone material according to the NORMAL 6/81 A and B recommendations;

gathering of representative samples according to NORMAL 3/80 recommendations, p. 6;

determination of the distribution of the pore volume as a function of their diameter, in accord with NORMAL A/80;

determination of water absorption by total immersion and imbibing capacity, according to NORMAL 7/81;

elimination of the sulfate ions and all soluble anions according to the following specific procedure:

immersion of the samples in $CO_2$-free deionized water in vat 1; forced circulation of the water with pump 4; through the ion exchange resin column 6; determination conductometically with 10 and by pH with 9 of the anions held on the column; determination on the basis of the $Ca(OH)_2$ concentration in solution of the quantity of $Ca(OH)_2$ to add to restore the stone material to its original state.

After exclusion of the ion exchange column 6, Ca(OH)$_2$ is added to the solution and forced circulation is continued until equilibrium is reached, that is until the resin absorbs no more sulfur; the sample is then removed from the water, its surface is dried and it is placed in a CO$_2$ atmosphere at controlled temperature to facilitate formation of calcium carbonate in the form of calcite rather than argonite which, being crystallized, is extremely delicate.

The sample so treated than has its morphological characteristics checked with an incident light optic microscope.

If necessary, the imbibing capacity and water absorption on total immersion are compared with those obtained before treatment.

With regard to the Ca(OH)$_2$ concentration determination indicated in the procedure, the Vs=volume of the system, that is that of the water contained in the vat 1 and in the conductor, the Vc=volume of the stone piece being treated, and, at least approximately, the Va=volume presumably involved in the sulfation must be known so that, since Vs−Vc=volume of H$_2$O, (Vs=Vc)/Va, will be tha value by which the Ca(OH)$_2$ concentration must be multiplied.

Of course, while the principle of the finding remains the same, the forms of realization and the details of the procedure may be varied widely from that described and illustrated here, without going beyond the bounds of the present invention.

We claim:

1. A process for the restoration of a stone monument or stone object contaiminated by calcium sulfate comprising immersing the object in deionized water so as to dissolve the calcium sulfate in solution, then circulating the water containing the dissolved calcium sulfate through an ion exchange resin which selectively traps the sulfate ion and releases calcium hydroxide into the solution according to the equation:

$$CaSO_4 \rightleftharpoons Ca^{++} + SO_4^{--} \rightarrow \text{ion exchange resin} \rightarrow Ca^{++} + 2OH^-$$

and then circulating the ion-exchanged water in a circulatory system back into contact with the monument or object and subsequently exposing the monument or object to carbon dioxide under controlled conditions sufficient to cause reprecipitation of the calcium ion on the monument or object as the carbonate in calcite crystalline form.

2. The process for the restoration of a stone monument or stone object according to claim 1, further comprising immersing the monument or object in carbon dioxide-free deionized water, providing forced circulation of the water through the ion exchange resin in a column, measuring conductivity and pH of the anions held on the column, determining the quantity of calcium hydroxide required to restore the stone material to its original state based on the calcium hydroxide concentration in the solution, adding calcium hydroxide to the solution and continuing forced circulation until equilibrium is reached and the resin absorbs no more sulfur, removing the monument or object from the water, drying its surface and placing the monument or object in a carbon dioxide atmosphere at controlled temperature to faciliate formation of calcium carbonate in calcite form on the surface thereof.

3. The process for the restoration of a stone monument or stone object according to claim 1, further comprising completely immersing the object in the deionized water.

4. The process for the restoration of a stone monument or stone object according to claim 1, further comprising determining the amount of calcium hydroxide needed to restore the stone monument to its original state by determining the Ca(OH)$_2$ concentration in solution and multipling by (Vs−Vc)/Va wherein Vs is the volume of the system, Vc is the volume of the stone piece, and Va is the volume involved in the sulfation ion exchange equation.

* * * * *